(12) United States Patent
Haupt

(10) Patent No.: US 6,211,833 B1
(45) Date of Patent: Apr. 3, 2001

(54) PARKING AID

(75) Inventor: Günter Haupt, Regensburg-Keilberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/472,057

(22) Filed: Dec. 23, 1999

(30) Foreign Application Priority Data

Dec. 23, 1998 (DE) ................................................ 198 59 999

(51) Int. Cl.$^7$ ...................................................... H01Q 1/32
(52) U.S. Cl. .................................. 343/713; 343/700 MS; 343/878
(58) Field of Search ........................... 343/713, 700 MS, 343/894, 873, 878; 367/909; 340/435, 436, 552

(56) References Cited

U.S. PATENT DOCUMENTS

| 4,766,444 | * | 8/1988 | Conroy et al. | 343/895 |
| 4,888,597 | * | 12/1989 | Rebiez et al. | 343/778 |
| 5,767,793 | | 6/1998 | Agravante et al. | |
| 5,844,523 | | 12/1998 | Brennan et al. | |
| 6,133,877 | * | 10/2000 | Sandstedt et al. | 343/700 MS |

FOREIGN PATENT DOCUMENTS

3244358C2    10/1984   (DE) .

* cited by examiner

*Primary Examiner*—Michael C. Wimer
*Assistant Examiner*—Ephrem Alemu
(74) *Attorney, Agent, or Firm*—Herbert L. Lerner; Laurence A. Greenberg; Werner H. Stemer

(57) ABSTRACT

The device has a transmitting and receiving device for electromagnetic radiation which is arranged in the region of a bumper and includes an RF circuit arranged on a support plate and at least two substantially planar antennas that interact with the RF circuit. The antennas are fixed on a plastic sheet. A printed circuit board has perforations for the passage of radiation from the RF circuit to the antennas. Spacers having a precise longitudinal extent are inserted into the perforations, and the plastic sheet is bonded onto the underside of the printed circuit board such that the antennas each bear on a spacer.

5 Claims, 1 Drawing Sheet

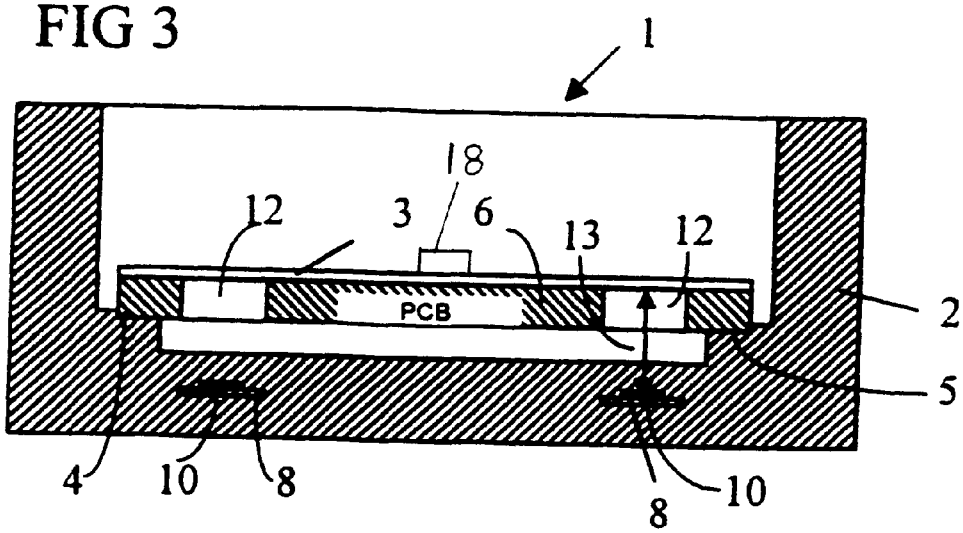
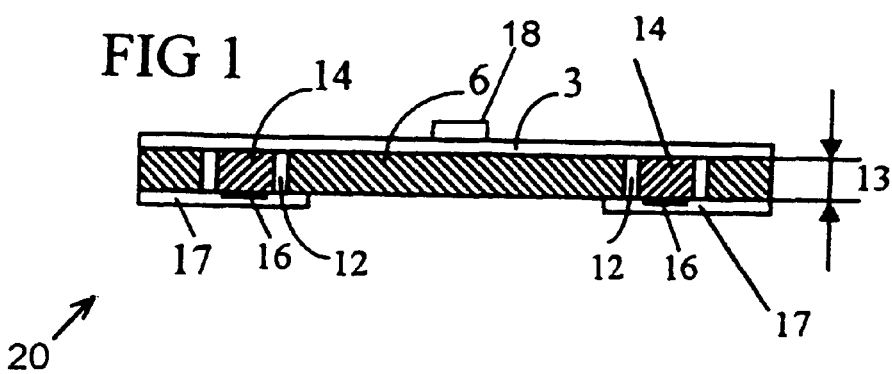
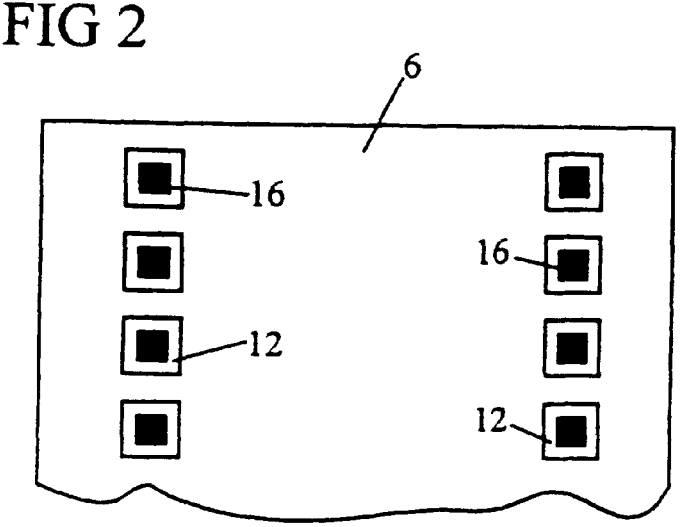

PARKING AID

BACKGROUND OF THE INVENTION

Field of the Invention

The invention relates, in general, to a device for detecting whether obstacles are being approached during parking or turning of a motor vehicle (parking aid). In particular, the device includes a transmitting and receiving device configured in the region of at least one bumper. The transmitting and receiving device has an RF circuit configured on a printed circuit board and at least two substantially planar antennas that are connected to the RF circuit.

German Patent DE 32 44 358 C2 describes the purpose and the possible places for attaching such a parking aid to a motor vehicle (also referred to as a maneuvering aid in that document).

If the parking aid uses radio-frequency electromagnetic radiation, then the precise spatial position of the substantially planar antenna elements, also known as antenna patches, is highly important, since these patches and the patch spacing determine the directional characteristics and the radiation characteristics of the radio-frequency (RF) radiation.

The antenna patches, together with a sheet bearing them, are embedded in the plastic composition of the housing of the known parking aid. As a result, in the best-case scenario, a tolerance of ±0.3 mm can be achieved regarding the spacing of the antenna patch. This spacing tolerance between the RF circuit and the antenna patches leads to a disturbing variation in the acoustic warning signals emitted by the parking aid in the event that an obstacle is being approached.

SUMMARY OF THE INVENTION

It is accordingly an object of the invention to provide a device for detecting whether obstacles are being approached during parking or turning of a motor vehicle, which overcomes the herein-mentioned disadvantageous of the heretofore known devices of this general type. In particular, an improved spacing tolerance of the antenna patches is provided. The accuracy of the parking aid is improved and the variation of the individual specimens is reduced.

With the foregoing and other objects in view there is provided, in accordance with the invention, a device for detecting whether obstacles are being approached during parking or turning of a motor vehicle. The device includes a support plate, and a transmitting and receiving device disposed adjacent at least one bumper. The transmitting and receiving device includes an RF circuit disposed on the support plate and at least two substantially planar antennas for interacting with the RF circuit. The obstacle detection device also includes: a plastic sheet fixed to the substantially planar antennas; a printed circuit board having perforations allowing for passage of radiation from the RF circuit to the substantially planar antennas; and spacers having a precise length. Each one of the spacers is inserted into a respective one of the perforations. The plastic sheet is bonded to the printed circuit board such that each one of the substantially planar antennas bear on a respective one of the spacers.

In accordance with an added feature of the invention, the spacers are bonded to the support plate.

In accordance with an additional feature of the invention, the plastic sheet is self-adhesive.

In accordance with another feature of the invention, the spacers consist of a material that is pervious to radiation and is undamaged from heat caused by soldering.

In accordance with a further feature of the invention, the printed circuit board has a surface that is opposite the substantially planar antennas and the support plate is bonded to the surface of the printed circuit board.

Other features which are considered as characteristic for the invention are set forth in the appended claims.

Although the invention is illustrated and described herein as embodied in a parking aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows portions of a parking aid including a printed circuit board;

FIG. 2 shows a view from the bottom of the printed circuit board shown in FIG. 1; and FIG. 3 shows a prior art parking aid.

DESCRIPTION OF THE PREFERRED EMBODIMENTS

Referring now to the figures of the drawing in detail and first, particularly to FIG. 3, thereof, there is shown a prior art parking aid 1 that has a housing 2 made of plastic, and a printed circuit board 6 accommodated inside the housing 2. In order to fix the position of the printed circuit board 6, two shoulders 4 and 5 are laterally provided in the housing 2. The printed circuit board 6 is produced, for example, from plastic that is commercially available under the designation FR4.

An RF circuit 18 is configured on a support plate 3 that is seated on the printed circuit board 6. The RF circuit 18 is part of a receiving and transmitting device 20 (See FIG. 1) that is not illustrated in any detail here since it is known per se and is not touched upon by the invention. The RF circuit 18 generates the electromagnetic radiation to be emitted and receives and evaluates the radiation that is reflected from obstacles. The electromagnetic radiation is microwave or radar radiation whose frequency is 24 GHz, for example, and whose bandwidth is 1.5 GHz. The support plate 3 can be produced from the metallic product sold under the trademark "Teflon", for example.

Portions 8 of a plastic sheet which bear small-format substantially planar antenna elements, the so-called antenna patches, 10 are embedded in the plastic wall of the housing 2.

The printed circuit board 6 is provided with perforations 12 in the regions between the RF circuit 18 on the support plate 3 and the antenna patches 10. The perforations 12 enable RF radiation to pass through unhindered. The plastic wall of the housing 2 is pervious to the RF radiation. The spacing 13 between the support plate 3 and each one of the antenna patches 10 is critical for accurate functioning of the parking aid 1.

Referring now to FIG. 1, portions of the parking aid 1 that are constructed differently from the prior art are shown. The transmitting and receiving device 20 includes the RF circuit 18 and the antenna patches 16. The antenna patches 16 (identified by reference numeral 10 in FIG. 3) are not embedded in the wall of the housing 2 as shown in FIG. 3, but rather are provided on the underside of the printed circuit board 6. Inventive spacers 14 are inserted into the perforations 12 of the printed circuit board 6. The length of the spacers 14 (shown in the vertical direction in the drawing) can be produced with great accuracy.

Each antenna patch 16 is fixed onto a portion of plastic sheet 17, for example, by bonding. Each portion of the plastic sheet 17 is fixed to the underside of the printed circuit board 6 such that the antenna patches 16 each bear on a spacer 14. Each portion of the plastic sheet 17 is designed to be self-adhesive and is bonded to the underside of the printed circuit board 6. The spacers 14 may likewise be fixed on the underside of the support plate 3 by bonding.

The spacers 14 are produced from a material that is pervious to radiation and is resistant to soldering. They must be undamaged after the process of soldering the RF circuit on the support plate 3.

The printed circuit board 6 is expediently bonded to the surface of the support plate 3 (the bottom surface in the drawing).

FIG. 2 shows the configuration of the perforations 12 in the printed circuit board 6 and of the configuration of the antenna patches 16 with respect to the perforations 12. The support plate 3 is not shown for clarity.

The spacers 14 can be produced in a very precise manner and the antenna patches 16 bear directly on the spacers 14. The spacers 14 bear directly on the support plate 3 with the RF circuit 18. Therefore, the tolerance of the spacing between the RF circuit 18 and the antenna patches 16 can be reduced approximately by a factor of 6. This results in the production of parking aids 1 with much closer and lower manufacturing tolerances.

I claim:

1. A device for detecting whether obstacles are being approached during parking or turning of a motor vehicle, comprising:

a support plate;

a transmitting and receiving device disposed adjacent at least one bumper and including an RF circuit disposed on said support plate and at least two substantially planar antennas for interacting with said RF circuit;

a plastic sheet fixed to said substantially planar antennas;

a printed circuit board having perforations allowing for passage of radiation from said RF circuit to said substantially planar antennas; and spacers having a precise length, each one of said spacers being inserted into a respective one of said perforations;

said plastic sheet bonded to said printed circuit board such that each one of said substantially planar antennas bear on a respective one of said spacers.

2. The device according to claim 1, wherein said spacers are bonded to said support plate.

3. The device according to claim 1, wherein said plastic sheet is self-adhesive.

4. The device according to claim 1, wherein said spacers consist of a material that is pervious to radiation and is undamaged from heat caused by soldering.

5. The device according to claim 1, wherein said printed circuit board has a surface that is opposite said substantially planar antennas and said support plate is bonded to said surface of said printed circuit board.

* * * * *